United States Patent
Vaissiere (10) Patent No.: US 9,354,091 B2
(45) Date of Patent: May 31, 2016

(54) METHOD OF DETERMINING A CALIBRATION TIME INTERVAL FOR A CALIBRATION OF A MEASUREMENT DEVICE

(71) Applicant: Endress + Hauser Messtechnik GmbH + Co. KG, Weil am Rhein (DE)

(72) Inventor: Dimitri Vaissiere, Wittersdorf (DE)

(73) Assignee: ENDRESS + HAUSER MESSTECHNIK GMBH + CO. KG, Weil Am Rhein (DE)

(*) Notice: Subject to any disclaimer, the term of this patent is extended or adjusted under 35 U.S.C. 154(b) by 23 days.

(21) Appl. No.: 14/363,871

(22) PCT Filed: Nov. 22, 2012

(86) PCT No.: PCT/EP2012/073311
§ 371 (c)(1),
(2) Date: Jun. 9, 2014

(87) PCT Pub. No.: WO2013/083411
PCT Pub. Date: Jun. 13, 2013

(65) Prior Publication Data
US 2015/0019151 A1    Jan. 15, 2015

(30) Foreign Application Priority Data
Dec. 9, 2011 (EP) .................................. 11192727

(51) Int. Cl.
*G01D 18/00* (2006.01)
*G06F 17/40* (2006.01)
(Continued)

(52) U.S. Cl.
CPC .............. *G01D 18/008* (2013.01); *G01D 18/00* (2013.01); *G01D 18/006* (2013.01); *G05B 19/401* (2013.01); *G06F 17/40* (2013.01); *G06F 19/00* (2013.01)

(58) Field of Classification Search
None
See application file for complete search history.

(56) References Cited

U.S. PATENT DOCUMENTS 3,362,217 A * 1/1968 Rush ....................... G01K 3/04
374/E3.004
4,858,161 A * 8/1989 Baumann ............... G01G 23/01
702/101

(Continued)

FOREIGN PATENT DOCUMENTS

CN     101426212 A    5/2009
EP       1743226 A2   1/2007

OTHER PUBLICATIONS

Donald Wyatt et al., "Managing Calibration Intervals", NCSL 1991 Annual Workshop & Symposium, Aug. 1, 1991, pp. 1-20, XP055027096.

(Continued)

*Primary Examiner* — Edward Cosimano
(74) *Attorney, Agent, or Firm* — Bacon & Thomas, PLLC (57) ABSTRACT

A method of determining a calibration time interval for a calibration of a measurement device for measuring a quantity to be measured, which allows a safe optimization of calibration time intervals between consecutive calibrations. Performing a first calibration of the device at a first calibration time; adjusting, repairing or replacing the device and restarting the method from the beginning in case the first measurement error exceeds a predetermined error range including zero; performing a second calibration of the device at a second calibration time, adjusting, repairing or replacing the device and restarting the method from the beginning in case the second measurement error exceeds a maximum permissible error; determining the calibration time, at which a third calibration of the device shall be performed, and which is determined based on the first and the second measurement error, a probability density function for determining a measurement error of the device solely due to a calibration uncertainty inherent to the first calibration, a probability density function for determining a measurement error of the device solely due to a calibration uncertainty inherent to the second calibration, and the first and the second calibration time.

8 Claims, 5 Drawing Sheets

(51) Int. Cl.
  *G06F 19/00* (2011.01)
  *G05B 19/401* (2006.01)

(56) References Cited

U.S. PATENT DOCUMENTS

| | | | | |
|---|---|---|---|---|
| 5,508,947 A * | 4/1996 | Sierk | ............... | F17C 13/02 |
| | | | | 702/104 |
| 6,493,836 B2 * | 12/2002 | Olarig | ............... | G06F 11/10 |
| | | | | 711/105 |
| 2002/0066052 A1 * | 5/2002 | Olarig | ............... | G06F 11/10 |
| | | | | 714/42 |

OTHER PUBLICATIONS

De Capua C. et al., "A Virtual Instrument for Estimation of Optimal Calibration Intervals by a Decision Reliability Approach", Virtual Environments, Human-Computer Interfaces and Measurement System S, 2005 IEEE Symposium on Jul. 18, 2005, Piscataway, NJ, USA., pp. 16-20, XP010873452.

International Search Report, EPO, The Netherlands, Mar. 7, 2013.

European Search Report, EPO, Munich, Germany, May 24, 2012.

ISO/CEI DIS guide 98-4, in Uncertainty of measurement—Part 4: role of measurement uncertainty in conformity assessment, published in 2009.

ISO/CEI Guide 98-3, Uncertainty of measurement—Part 3: Guide to the expression of uncertainty in measurement (GUM:1995), 2008; JCGM 100 (publicly available version).

ISO/CEI Guide 98-3/S1, Uncertainty of measurement—Part 3: Guide to the expression of uncertainty in measurement (GUM:1995)—Propagation of distributions using a Monte Carlo Method, 2008; JCGM 101(publically available version).

ISO/CEI 17025 "General requirements for the competence of testing and calibration laboratories", Aug. 2005.

English translation of Chinese Office Action dated Nov. 10, 2015, for CN 201280060630.7.

* cited by examiner

METHOD OF DETERMINING A CALIBRATION TIME INTERVAL FOR A CALIBRATION OF A MEASUREMENT DEVICE

TECHNICAL FIELD

The present invention concerns a method of determining a calibration time interval for a calibration of a measurement device for measuring a quantity to be measured.

BACKGROUND DISCUSSION

Measurement devices are used in nearly all branches of industry for measuring physical quantities, in particular quantities related to ongoing production processes. Measurement indications indicating the value of the quantity measured by the device are for example commonly used in process automation for monitoring, controlling and/or regulating a production process at a measurement site.

There is a wide range of measurement devices on the market, like for example level measurement devices for measuring a level of a product in a container, flow meters for measuring a flow of a product through a pipe, temperature measurement devices or pressure measurement devices.

In order to ensure, that theses devices fulfill certain measurement properties specified for them, in particular a specified measurement accuracy, and/or comply to certain standards, they are re-calibrated regularly.

Calibration is a commonly used procedure for establishing a relation for obtaining a measurement result for a measured quantity from a measurement indication of a measurement device. Also calibration is used to check conformity of a device to a given specification. In both cases the measurement device performs at least one measurement task according to a given operating procedure, during which at least one given value of the quantity to be measured by the device is provided by a corresponding reference or standard. A typical operating procedure includes for example measurements of a minimal and a maximal value of the quantity, within a measurement range of the device. During the operation procedure, the values of the quantity provided by the reference or standard and the corresponding measurement indications of the measurement device are recorded. Based on this data the corresponding measurement errors are calculated, which in most cases are determined as the differences between the measurement indications and the corresponding values of the quantity to be measured provided by the reference or standard.

In addition a maximum permissible error between the values of the quantity provided by the standard or reference and the corresponding measurement indications of the device is provided. In case the measurement errors between the values of the quantity provided by the standard or reference and the corresponding measurement indications derived by the measurement device exceed the maximum permissible error, the device is considered not to conform. As a consequence, adjustment, repair or replacement of the measurement device is required. Required adjustments are usually performed based on the data obtained during the calibration procedure. They include for example adjustments of offset, gain and/or span of the measurement indication.

If the measurement errors do not exceed the maximum permissible error conformity of the device is declared and generally no further actions are taken.

Today measurement devices are generally calibrated periodically, after fixed calibration time intervals, e.g. intervals recommended by the manufacturer for the specific type of device. Thus the same calibration time interval is applied, regardless of whether a large measurement error, e.g. an error which is very close to exceeding the maximum permissible error, or a very small measurement error was determined during the last calibration.

In the first case, there is a high probability, that the measurement error of the device will exceed the maximum permissible error during the calibration time interval. If this is the case, the measurement error of the device may cause a potential danger to the people, the environment and the ongoing production process at the measurement site it is operated on in the time prior to the next calibration.

In the second case, there is a high probability, that the device will still be in full compliance at the end of the calibration time interval. Thus a much larger calibration time interval could have been applied without increasing the risk involved in operating the device. A larger calibration time interval between consecutive calibrations would be especially advantageous in applications, wherein calibrations are cost and time intensive, e.g. because they require a whole section of a production site to be shut down, in order to transfer the device from its measurement site to a calibration site.

Despite of this, it is general practice to apply fixed standard calibration time intervals to devices, which were found to be fully compliant.

In European Patent, EP 1 743 226 B1 a method is described, for determining an optimized service interval between consecutive maintenance services of a field device, which is adapted to the conditions prevailing at the operation site of the field device. According to this method, the time interval between consecutive services is determined based on service information, including application-specific parameters prevailing at an operating site of the field device, device-specific parameters, as well as historical data and calibration data from a previous calibrations of the device.

Thus service intervals of devices operating in a rough environment, which is e.g. subjected to extreme temperatures, temperature variations, pressures, and/or pressure variations, or exposed to abrasive and/or chemically aggressive products will be much shorter, than service intervals for devices operating under more friendly conditions.

Unfortunately, it is generally not safe to apply the same method in order to optimize calibration time intervals. The main reason for this is, that it is usually not possible to predict, when or on which timescale an initially fully compliant device will develop a relevant measurement error.

SUMMARY OF THE INVENTION

It is an object of the invention to provide a method of determining a calibration time interval for a calibration of a measurement device for measuring a quantity to be measured, which enables the user to safely optimize calibration time intervals in between consecutive calibrations.

To this extend, the invention comprises a method of determining a calibration time interval for a calibration of a measurement device for measuring a quantity to be measured, comprising the steps of:
performing a first calibration of the device at a first calibration time, wherein a first measurement error of the device is determined,
adjusting, repairing or replacing the device and restarting the method from the beginning in case the first measurement error exceeds a predetermined error range including zero, performing a second calibration of the device at a second calibration time, wherein a second measurement error of the device is determined, adjusting, repairing or replacing the device and restarting the method from the beginning in case the second measurement error exceeds a predetermined maximum permissible error, determining whether a significant drift between the first and the second measurement error occurred, and in case a significant drift occurred, determining the calibration time, at which a third calibration of the device shall be performed, as a third time, which is earlier or equal to a time at which the measurement error of the device will exceed the predetermined maximum permissible error with a given confidence level according to a probability density function of a crossing time at which the measurement error of the device will exceed the maximum permissible error, which probability density function is determined based on the first and the second measurement error, a probability density function for determining a measurement error in the first calibration solely due to a calibration uncertainty inherent to the first calibration, a probability density function for determining a measurement error in the second calibration solely due to a calibration uncertainty inherent to the second calibration, and the first and the second calibration time.

According to a preferred embodiment, the predetermined error range is set to correspond to an upper limit for the uncertainty of the first calibration procedure, given by a capability requirement for the first calibration procedure to be capable of performing the calibration, or the predetermined error range has a lower limit given by a negative value of the uncertainty inherent to the first calibration and an upper limit given by a positive value of the uncertainty inherent to the first calibration, or the error range has an upper limit equal to a given percentage of an upper limit of the maximum permissible error and a lower limit equal to a given percentage of a lower limit of the maximum permissible error, wherein the percentage of the upper limit of the maximum permissible error is larger or equal to the positive value of the uncertainty of the first calibration, and small compared to the upper limit of the maximum permissible error, and wherein the percentage of the lower limit of the maximum permissible error is smaller or equal to the negative value of the uncertainty of the first calibration, and large compared to the lower limit of the maximal permissible error.

The invention further comprises a first refinement, wherein a statistically representative number of pairs of random measurement errors is generated, each comprising:

a first random measurement error, which is equal to a sum of the first measurement error and a random additive generated according to a probability distribution given by a probability density function for determining a measurement error during calibration, which is solely due to an uncertainty inherent to the first calibration procedure, and a second random measurement error, which is equal to a sum of the second measurement error and a random additive generated according to a probability distribution given by a probability density function for determining a measurement error during calibration, which is solely due to an uncertainty inherent to the second calibration procedure.

A further refinement of the first refinement further comprises the steps of:

for each pair determining a slope of a straight line passing through the first random measurement error at the first time and through the second random measurement error at the second time, deriving a probability density function of a slope based on all determined slopes and their frequencies of occurrence, determining that a significant drift between the first and the second measurement error occurred with a given significance level, in case an average of all determined slopes is larger than zero and an integral of the probability function of the slope over all negative slopes is smaller than the significance level, and in case the average of all determined slopes is smaller than zero and an integral of the probability function of the slope over all positive slopes is smaller than the significance level.

A further refinement of the first refinement further comprises the steps of:

for each pair of random measurement errors determining a crossing time at which a straight line passing through the first random measurement error at the first time and through the second random measurement error at the second time will exceed the maximum permissible error, and determining the probability density function of the crossing time at which the measurement error of the device will exceed the maximum permissible error, as a frequency distribution of these crossing times.

A further refinement comprises a method according to the invention, wherein in case no significant drift was determined the calibration time at which the third calibration shall be performed is smaller or equal to a sum of the second time and a predetermined maximal permissible calibration time interval.

The invention further comprises a second method of determining a calibration time interval for a calibration of a measurement device for measuring a quantity to be measured, based on a non-linear model comprising a given number of coefficients for a time dependency of a measurement error of the device comprising the steps of:

performing a number of calibrations of the device larger or equal to the number of coefficients at consecutive calibration times, during each of which a measurement error of the device is determined, adjusting, repairing or replacing the device and restarting the method from the beginning in case the first measurement error exceeds a predetermined error range including zero, and in case any of the measurement errors exceeds a predetermined maximum permissible error, determining the calibration time, at which a next calibration of the device shall be performed, as a next time, which is earlier or equal to a time at which the measurement error of the device will exceed the predetermined maximum permissible error with a given confidence level according to a probability density function of a crossing time at which the measurement error of the device will exceed the maximum permissible error, which probability function is determined based on the measurement errors, the times at which the calibrations were performed, and probability density functions for determining measurement errors during each of the calibrations solely due to the calibration uncertainty inherent to the respective calibration.

A refinement of the second method comprises a method, wherein a statistically representative number of k-tupels of random measurement errors is generated, wherein each measurement error is equal to a sum of the measurement error determined during the corresponding calibration and a random additive generated according to a probability distribution given by a probability density function for determining a measurement error during the respective calibration, which is solely due to an uncertainty inherent to the respective calibration procedure, and for each k-tupel determining a vector of coefficients by fitting the random measurement errors of the k-tupel to the non-linear model, for each vector of coefficients determining a crossing time at which a measurement error described by the model based on this vector of coefficients and passing through the random measurement errors of the k-tupel at the corresponding calibration times exceeds the maximum permissible error, and determining the probability density function of the crossing time at which the measurement error of the device will exceed the maximum permissible error as a frequency distribution of the crossing times.

The invention and further advantages are explained in more detail using the FIGURE of the drawing, in which one exemplary embodiment is shown.

DETAILED DISCUSSION IN CONJUNCTION WITH THE DRAWING

The method according to the invention concerns a determination of a calibration time interval for a calibration of a measurement device for measuring a quantity to be measured. The device can be any measurement device requiring repeated calibration, e.g. a pressure measurement device for measuring a pressure, a level measurement device for measuring a level of a product in a container or a flow meter measuring a mass of volume flow of a product through a pipe.

Figure 2:
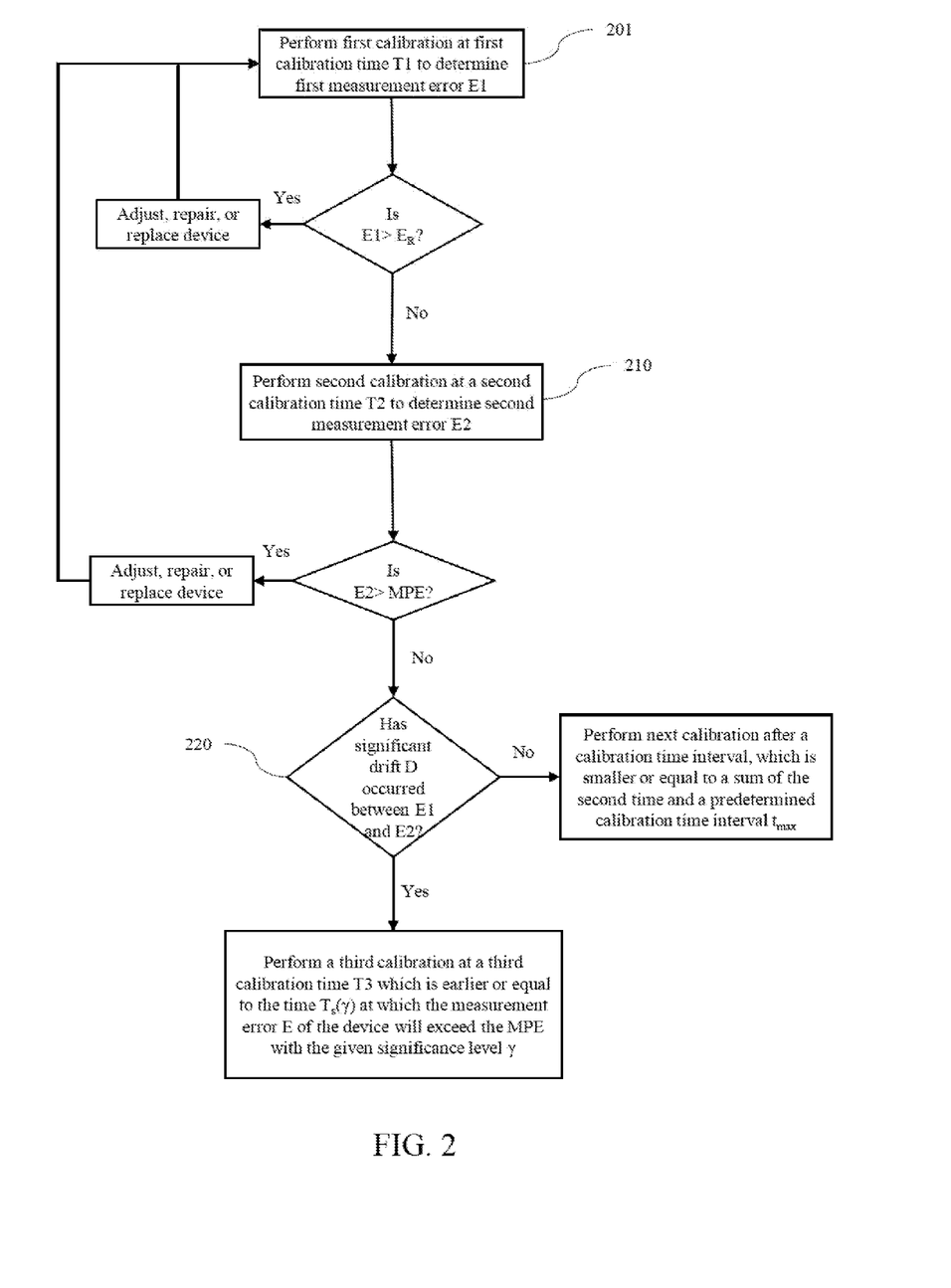
FIG. 2 illustrates an exemplary embodiment of a flow diagram of a process for determining a calibration time interval for a calibration of a measurement device.

To begin with, as seen in FIG. 2 step 201, a first calibration of the device is performed at a first time T1 on a calibration site. During this first calibration a first measurement error E1 of the device is determined with a first uncertainty $+/-U_{E1}$ inherent to the first calibration. The term uncertainty of a measurement error is used throughout this application to denominate an uncertainty of a determination of the measurement error, which is solely due to the respective calibration process.

Obviously, calibration procedures applied to perform a calibration have to be capable of performing the calibration. This capability requirement is for example described in ISO/CEI DIS guide 98-4, in Uncertainty of measurement—Part 4: role of measurement uncertainty in conformity assessment, published in 2009. In the context of calibration this requires for the uncertainty U of the calibration to be small compared to a given maximum permissible error MPE.

The maximum permissible error MPE defines the largest measurement error that will be allowed for the device. It is given as a maximum permissible error range [+MPE; −MPE], having a positive upper limit +MPE equal to the largest allowable positive measurement error E, and a negative lower limit −MPE equal to the largest allowable negative measurement error E.

Since calibration is frequently used to ensure, that the measurement device complies to a certain measurement accuracy specified for it, the maximum permissible error MPE is quite often determined based on the measurement accuracy specified for the device. In case a measurement error E of the device exceeds the maximum permissible error MPE, the device is considered not to conform. As a consequence adjustment, repair or replacement of the measurement device is required. Adjustments can generally be performed based on the data obtained during the calibration procedure. They can include for example adjustments of offset, gain and/or span of the measurement indication.

The determination of the calibration uncertainty U of measurement errors E determined in calibrations is known in the art. Its is for example described in: ISO/CEI Guide 98-3, 'Uncertainty of measurement—Part 3: Guide to the expression of uncertainty in measurement (GUM:1995), 2008; JCGM 100 as well as in ISO/CEI Guide 98-3/S1, 'Uncertainty of measurement—Part 3: Guide to the expression of uncertainty in measurement (GUM:1995)—Propagation of distributions using a Monte Carlo Method, 2008; JCGM 101. For accredited calibrations according to ISO/CEI 17025 'General requirements for the competence of testing and calibration laboratories', uncertainty determination is compulsory.

The capability requirement is generally considered to be fulfilled, as long as the maximum permissible error MPE is at least a few times, e.g. three times, preferable five or more times, the size of the uncertainty U of the applied calibration. Thus the capability requirement renders an upper limit $U_{max}$ for the uncertainty U of calibration.

In case the first measurement error E1 exceeds a predetermined error range $E_R$ including zero, the device is adjusted and/or repaired, and the method according to the invention is restarted from the beginning, by determining the first measurement error E1 of the device. Adjustments can be performed based on the data obtained during the calibration procedure. They can include for example adjustments of offset, gain and/or span of the measurement indication of the device.

The error range $E_R$ is preferably defined in accordance with the capability requirement mentioned above. In this case it is set to correspond to the upper limit $U_{max}$ for the uncertainty U of the calibration, which uncertainty U of the first calibration must not exceed according to the capability requirement, in order for the calibration procedure to be capable of performing the calibration.

Alternatively, the error range $E_R$ can be based on the uncertainty $+/-U_{E1}$ of the first calibration. This can for example be done by setting a lower limit of the error range $E_R$ equal to the negative value of the uncertainty $-U_{E1}$, and correspondingly setting an upper limit of the error range $E_R$ equal to the positive value of the uncertainty $+U_{E1}$.

$$E_R := [-U_{E1}; +U_{E1}]$$

In case the maximal permissible error MPE is much larger, e.g. ten or more times larger, then the uncertainty $+/-U_{E1}$, the upper and lower limit of the error range $E_R$ can be set equal to a small multiple of the positive and negative value of the uncertainty $+/-U_{E1}$.

Alternatively, the upper and lower limit of the error range $E_R$ can be set equal to a given percentage x % of the upper and the lower limit +MPE,−MPE of the maximum permissible error MPE:

$$E_R := [X\%(+MPE); x\%(-MPE)].$$

In this case, the percentage X % of the upper limit +MPE of the maximum permissible error MPE has to be larger or equal to the positive value of the uncertainty $+U_{E1}$ and small compared to the upper limit +MPE, and the percentage X % of the lower limit −MPE of the maximum permissible error MPE has to be smaller or equal to the negative value of the uncertainty $-U_{E1}$ and large compared to the lower limit −MPE of the maximum permissible error MPE.

In case the first measurement error E1 does not exceed the error range $E_R$, the device is put back into operation for the duration of a first calibration time interval $t_0$.

At the end of this first calibration time interval $t_0$, as seen in step 210 of FIG. 2, a second calibration of the device is performed at a second time T2 on a calibration site. The calibration time interval $t_0$ is preferably a standard calibration time interval recommended by the manufacturer of the device. The second calibration is performed in the same way as the first calibration and a second measurement error E2 of the device is determined with a second uncertainty $+/-U_{E2}$ inherent to the second calibration.

Both calibrations are performed according to a predefined operating procedure, during which the device measures at least one given value Q of the quantity to be measured and indicates a corresponding measurement indication. The given value Q of the quantity to be measured is provided by a corresponding reference or standard on the calibration site. Based on the given value Q and the corresponding measurement indication the measurement errors E1, E2 of the device are determined, generally as differences between the measurement indications indicated by the device and the corresponding given values Q.

In order to make the calibration results of the first and the second calibration comparable, the operating procedures used in the first and second calibration both foresee measurements of approximately the same given values Q to be measured. Apart from this, the two operating procedures do not necessarily have to be identical. It is for example possible to perform different numbers of repetitions of measurements of the given value Q in the two operating procedures. Applying different operating procedures will in most cases result in different uncertainties $+/-U_{E1}$, $+/-U_{E2}$ of the first and the second measurement error E1, E2 inherent to the first and the second calibration respectively.

The uncertainties $+/-U_{E1}$, $+/-U_{E2}$ inherent to the first and the second measurement error E1, E2 are uncertainties due to the respective calibration process itself. They each comprise an uncertainty with which the given value Q of the quantity was provided, uncertainties due to the operating procedure applied, e.g. due to the number of repetitions of the measurement of the given quantity Q, as well as uncertainties due to variable parameters, like for example an ambient temperature, pertinent to the calibration process that affected the measurement indications of the device during the respective calibration.

Determination of the respective uncertainty $+/-U_{E1}$, $+/-U_{E2}$, is preferably based on a probability density function $PDF_1(e_{cal1})$, $PDF_2(e_{cal2})$ for a determination of a measurement error $e_{cal1}$, $e_{cal2}$ during the respective calibration procedure, which is solely due to the calibration uncertainty inherent to the calibration procedure itself. Determination of this type of probability density functions is also described in the standards cited above.

Figure 1:
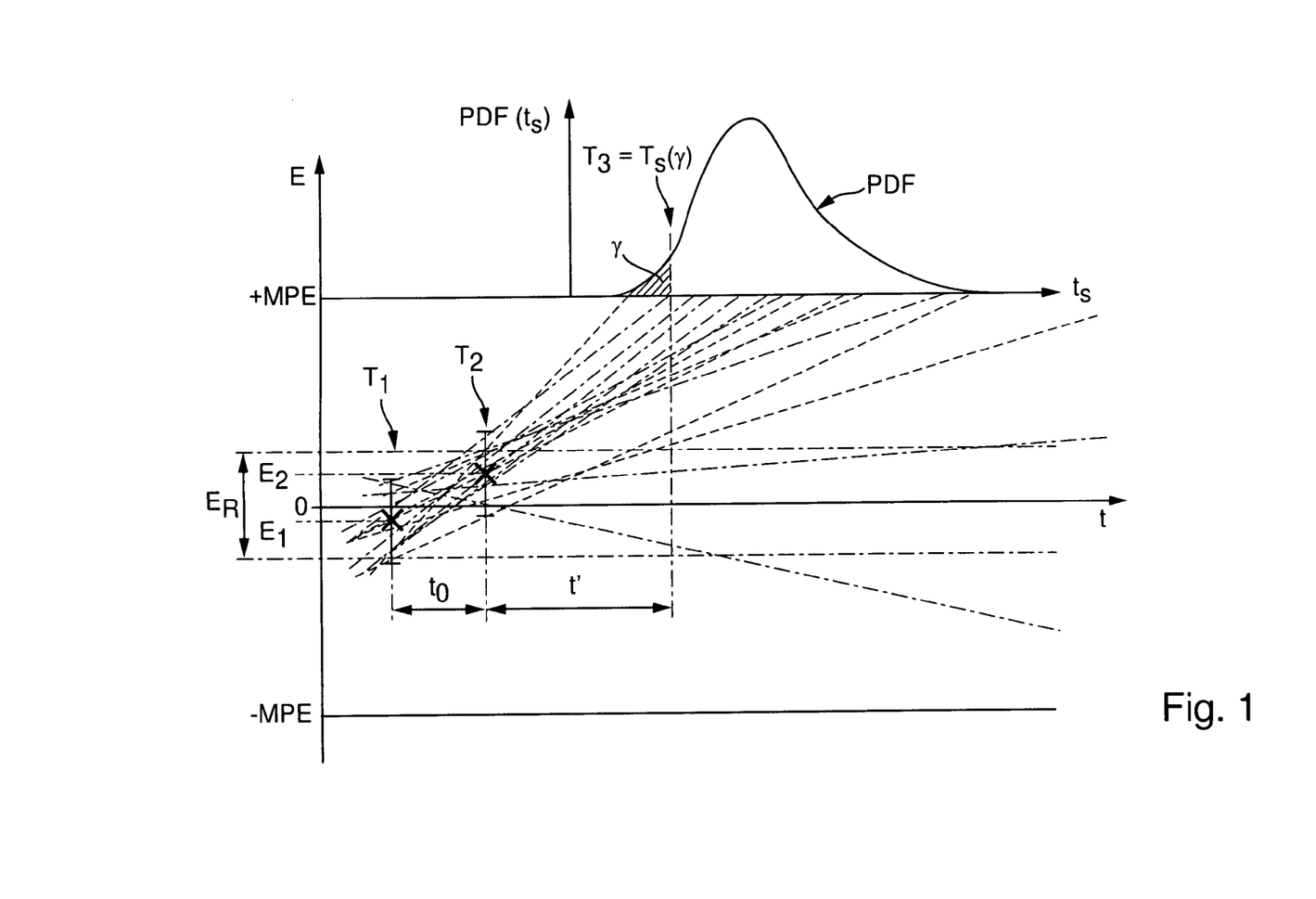
FIG. 1 shows: measurement errors of a measurement device determined in two consecutive calibrations and a probability density function for a time at which the measurement error of the device will exceed a maximum permissible error.

FIG. 1 shows a diagram depicting a measurement error E of the device as a function of time t. In this diagram the first and the second measurement error E1, E2 are marked by crosses at the times T1, T2 at which they were determined. In addition the uncertainties $+/-U_{E1}$, $+/-U_{E2}$ inherent to the first and second measurement error E1, E2 are indicated by corresponding error bars in FIG. 1.

The second measurement error E2 is compared to the given maximum permissible error MPE.

In case the second measurement error E2 exceeds the maximum permissible error MPE, the device is adjusted, repaired or replaced and the method according to the invention is restarted from the beginning, starting with the performance of the first calibration.

Provided that the first the measurement error E1 did not exceed the error range $E_R$ and the second measurement error E2 did not exceed the maximum permissible error MPE, it is then determined, whether there is a significant drift D between the first and the second measurement error E1, E2, as seen in step 220 of FIG. 2. In a most simple case the drift D can be calculated as a slope of a straight line representing the measurement error E as a function of time t passing through both measurement errors E1, E2, given by difference between the first and the second measurement error E1, E2 in relation to the time difference between the second time T2 and the first time T1. Here a drift D will be considered significant, in case the slope exceeds a predetermined threshold, e.g. a threshold of 3%.

More accurate results will be obtained however, if the drift D is determined numerically, taking into account the calibration uncertainties inherent to the respective calibration.

Figure 3:
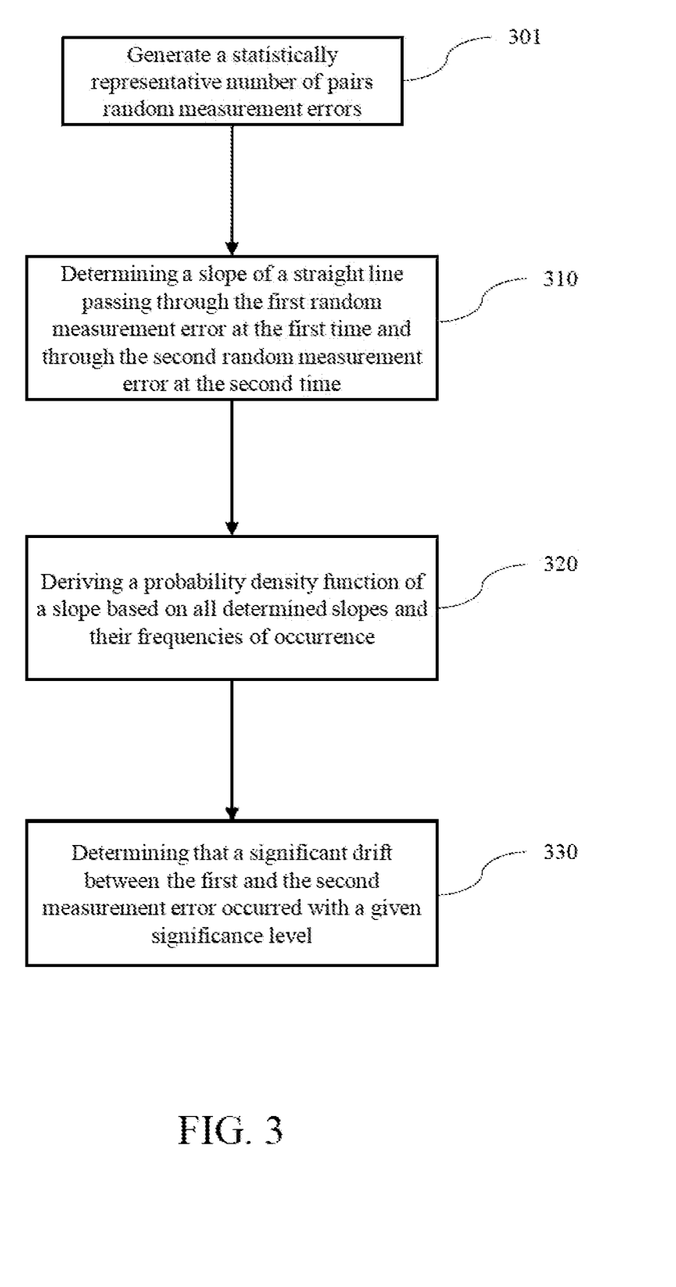
FIG. 3 illustrates additional steps of the process illustrated in FIG. 2 for determining a calibration time interval for a calibration of a measurement device.

At step 301 in FIG. 3, this can be done by generating a statistically representative number of pairs of first and second random measurement errors (E1', E2'). Each random measurement error E1', E2' is equal to a sum of the respective determined measurement error E1, E2 and a random additive $e_1'$, $e_2'$ accounting for the measurement uncertainty of the respective calibration procedure. The random additives $e_1'$, $e_2'$ are generated according to the probability distribution given by the respective probability density function $PDF_1(e_{cal1})$ $PDF_2(e_{cal2})$.

At step 310, for each pair (E1', E2') a slope m of a straight line representing a measurement error E'(t) as a function of time t passing through the first random measurement error E1' at the first time T1 and through the second random measurement error E2' at the second time T2 is determined as:

$$m = \frac{E2' - E1'}{T2 - T1}.$$

At step 320, based on all the numerically determined slopes m, and their frequencies of occurrence, a probability density function $PDF_M(m)$ for the slope m is derived, which is then used to determined, whether a significant drift D occurred at step 330.

In a first step, it is determined, whether the drift D is positive, negative or whether no drift D occurred. The drift D is considered positive, if an average $\overline{m}$ of all determined slopes m is larger than zero. It is considered negative, if the average $\overline{m}$ of all the determined slopes m is smaller than zero. In case the average $\overline{m}$ equals zero, it is determined that no drift D occurred.

A positive drift d ($\overline{m}>0$) is considered significant, as long as an integral $P_S^+$ of the probability function $PDF_M(m)$ of the slope m over all negative slopes $-\infty<m<0$ does not exceed a given significance level $\alpha$, as described by the relation given below:

$$P_S^+ = \int_{-\infty}^{0} PDF_M(m)dm \leq \alpha.$$

Correspondingly, a negative drift D ($\overline{m}<0$) is considered significant, as long as an integral $P_S^+$ of the probability function $PDF_M(m)$ of the slope m over all positive slopes $0<m<+\infty$ does not exceed a given significance level $\alpha$, as described by the relation given below:

$$P_S^- = \int_{0}^{+\infty} PDF_M(m)dm \leq \alpha.$$

This method has the advantage, that renders the statistical significance of the drift D, by fully taking into account the calibration uncertainties involved in determining the first and the second measurement error E1, E2.

In case a significant positive or negative drift D was determined, because the respective integral $P_S^+$, $P_S^-$ over the probability function $PDF_M(m)$ of the slope m exceeded the given significance level $\alpha$, e.g. a significance level of 5%, it is assumed, that the underlying problem of the measurement device, that caused the drift D over the calibration time interval $t_0$ will cause a further increase of the measurement error E of the device at the same rate and in the same direction as during the first calibration time interval $t_0$ when it is put back into operation after the second calibration.

Thus based on the first and the second measurement error E1, E2, their uncertainties $U_{E1}$, $U_{E2}$ and the time difference $T2-T1=t_0$ between the second and the first time, a probability density function $PDF_{TS}(t_S)$ of a crossing time is at which the measurement error E of the device will exceed the predefined maximum permissible error MPE can be determined.

Figure 4:
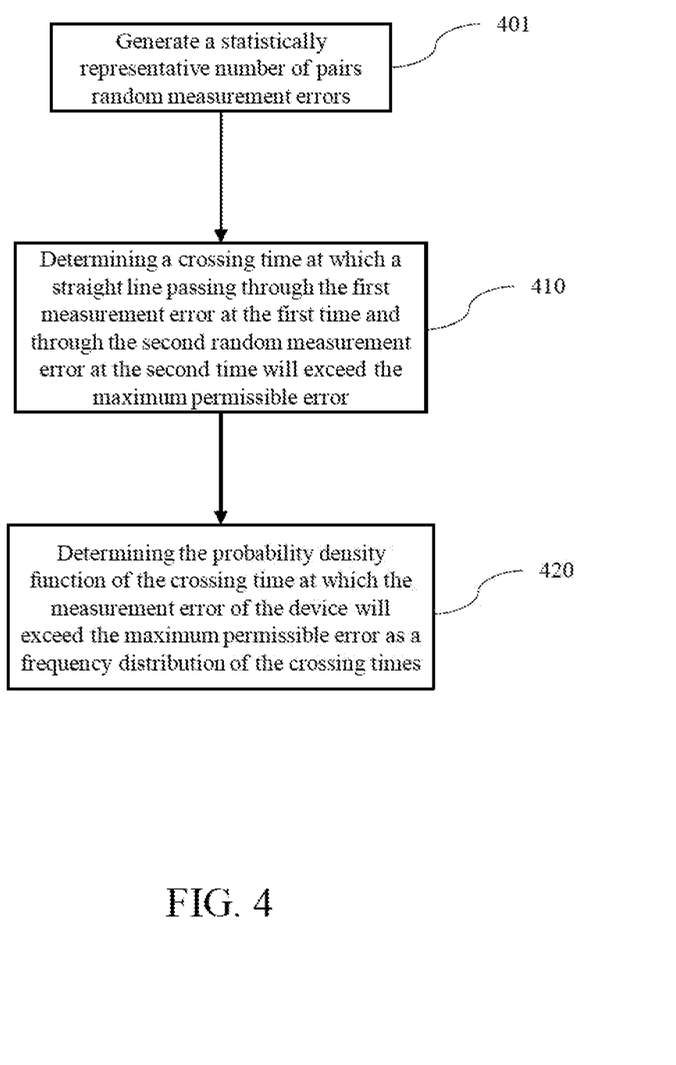
FIG. 4 illustrates further steps of the process illustrated in FIG. 2 for determining a calibration time interval for a calibration of a measurement device.

The probability density function $PDF_{TS}(t_S)$ is preferably determined numerically by repeatedly generating a statistically representative number of pairs of random measurement errors (E1', E2'), at step 401 in FIG. 4, in the same way as described above.

At step 410, for each pair (E1', E2') a crossing time is at which a straight line E'(t) representing the measurement error E as a function of time t passing through the first random measurement error E1' at the first time T1 and through the second random measurement error E2' at the second time T2 will exceed the maximum permissible error MPE is determined. In case the first random measurement error E1' is smaller than the second random measurement error E2', this will be the time at which the straight line E'(t) crosses the upper limit +MPE of the maximum permissible error range [−MPE; +MPE]. In case the first random measurement error E1' is larger than the second random measurement error E2', this will be the time at which the straight line E'(t) crosses the lower limit +MPE of the maximum permissible error range [−MPE; +MPE].

At step 420, based on this the probability density function $PDF_{TS}(t_S)$ is then determined as a frequency distribution of the crossing times $t_S$.

Thus a confidence level $\gamma$ can be set according to the needs of the owner of the device, and a time $T_S(\gamma)$ at which the measurement error e of the device will exceed the maximum permissible error MPE can be predicted by the probability density function $PDF_{TS}(t_S)$ with the given confidence level $\gamma$ by solving the following equation for $T_S(\gamma)$:

$$\int_{-\infty}^{T_S(\gamma)} PDF_{TS}(t_S)dt_S = \gamma.$$

The given confidence level $\gamma$ does not necessarily have to be the same as the significance level $\alpha$ applied to determine whether a significant drift D occurred.

In case a significant drift D was determined, the next (third) calibration of the device will be performed at a third calibration time T3 which is earlier or equal to the time $T_S(\gamma)$ at which the measurement error E of the device will exceed the maximum permissible error MPE with the given significance level $\gamma$.

The resulting next calibration time interval t', given by the difference between the third calibration time T3 and the second calibration time T2, will be long if the significant drift D is small and short if the significant drift D is large.

Depending on the size of the drift D, the resulting calibration time interval t' can thus be significantly longer or shorter than the previous calibration time interval $t_0$ or a standard calibration time interval recommended by the manufacturer of the device.

In case no significant drift D was determined and the first measurement error E1 did not exceed the error limit $E_R$, the next calibration will be performed after a calibration time interval t', which is shorter or equal to a predetermined maximal calibration time interval $t_{max}$.

$$t' \leq t_{max}$$

Thus in this case, the (third) calibration time T3 at which the device shall be calibrated again is smaller or equal to the sum of the second calibration time T2 and the maximal calibration time interval $t_{max}$:

$$T3 \leq T2 + t_{max}$$

As described above, the method renders an upper limit for the third calibration time T3, at which the device shall be calibrated again, after it has been put back into operation after the second calibration.

In order to optimize time and costs involved in calibrations, this upper limit is preferably applied in all cases, where the resulting calibration time interval t' between the second and the third calibration is sufficiently long, to make it worth while to put the device back into operation. For shorter resulting calibration time intervals t', it is more efficient to adjust, repair or replace the device immediately after the second calibration, rather than to reinstall it at its measurement site for the short calibration time interval t'.

Since statistically most device are found in full compliance during calibration, using this method will allow for an increase in calibration time intervals t' for these devices. On the other hand the method reduces calibration time intervals t' applied to less compliant devices to an extend which is appropriate with respect to the present measurement accuracy of the device in relation to the maximum permissible error MPE and its historic development. Thus the method contributes to an increased safety in operating these measurement devices.

Obviously the method can be continued throughout the live time of the device, until the device requires adjustment, repair or replacement. Until then the next calibration time $T_n$ can be determined after each calibration as described above based on the measurement errors $E_{n-1}$ (determined during the last performed calibration performed at the time $T_{n-1}$) and $E_{n-2}$ (determined during the calibration performed prior to the last calibration performed at the time $T_{n-2}$) of the two previous calibrations and the uncertainties inherent to them. It is only after an adjustment, repair or replacement had to be performed, that the method needs to be restarted from the beginning starting with the determination of a first measurement error E1 with a first uncertainty $U_{E1}$ of the adjusted or repaired device or of the device replacing the previous device.

In the method described above a linear model is applied, to extrapolate the new calibration time T3 based on measurement errors E1, E2 determined during only two previously performed calibrations. This linear model is ideal for robust measurement devices for industrial use, having stable long term measurement properties. Measurement errors E of these devices are typically fairly constant over longer time scales. Their development over time is thus very well represented by the linear model. These devices usually have long life times, e.g. between ten and thirty years, and are re-calibrated after comparably long calibration time intervals, e.g. once a year. Such devices are for example flow meters, e.g. magnetic-inductive, coriolis or vortex flow meters for industrial use.

On the other hand there are measurement devices, like for example pH-probes, on the marked, which exhibit more rapidly changing measurement errors E, e.g. due to ageing or wearing components. These device usually have shorter life times and require much more frequent re-calibrations. Thus the development of their measurement errors E over time is better represented by a non-linear model. In most cases a general time dependency of the measurement errors E exhibiting this non-linear drift is known. If it is unknown, it can be easily determined by monitoring the measurement errors E of at least one of the devices of the respective type over time. Based on this, the type of non-linear model most suitable for describing the non-linear drift of the measurement error E of the type of device can be determined. The model can for example be a polynomial of a given order or an exponential function. According the model the measurement error E is expressed as a function f of time t and a vector of a given number p of unknown coefficients $(a_1, \ldots, a_p)$.

$$E(t)=f(t;a_1,\ldots,a_p)$$

Thus the method according to the invention can in this case be based on the known or determined non-linear model most suitable for describing the time dependency of the measurement errors E(t) of these measurement devices.

Figure 5:
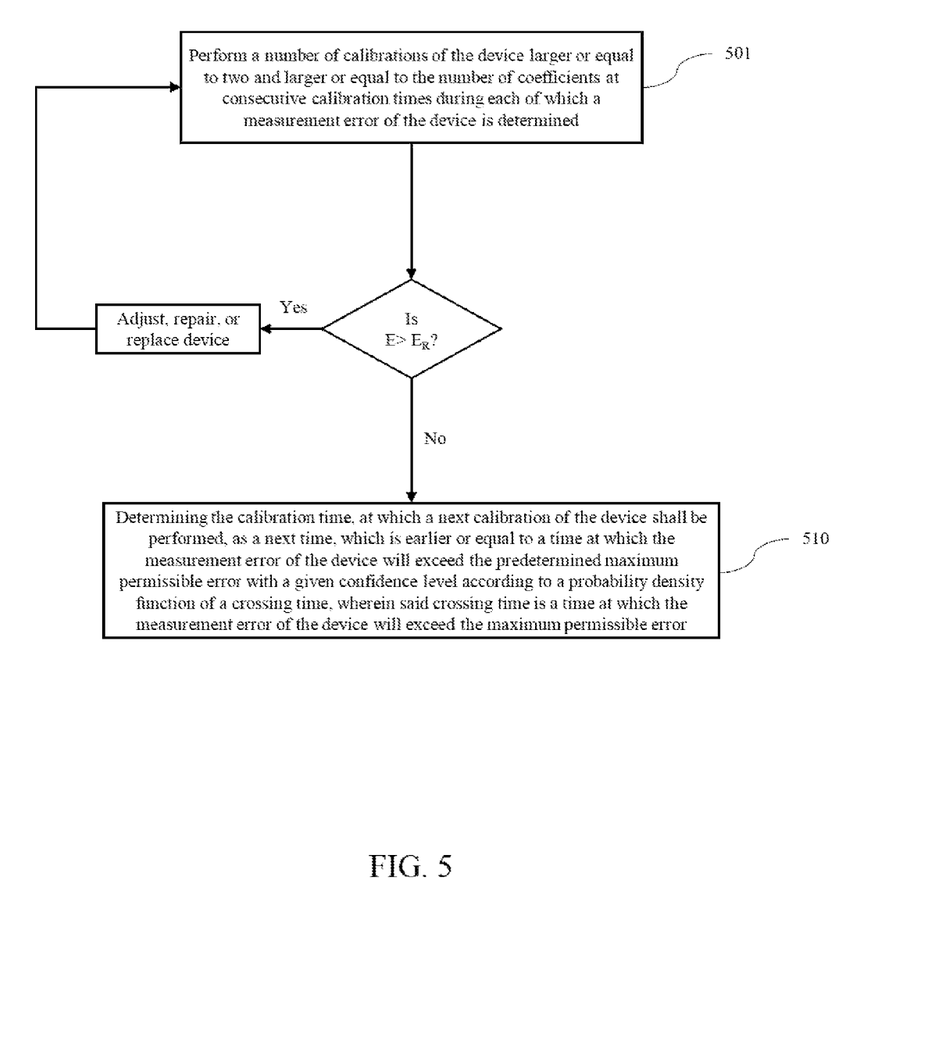
FIG. 5 illustrates another exemplary embodiment of a flow diagram of a process for determining a calibration time interval for a calibration of a measurement device.

In analogy to the previously described linear method, at step 501 of FIG. 5, a number of k calibrations larger or equal to the number p of coefficients is performed at consecutive calibration times T1, ..., Tk and the measurement errors E1, ..., Ek determined in these calibrations and the corresponding calibration times T1, ..., Tk are recorded. Again all k measurement errors E1, ..., Ek are required not to exceed the maximum permissible error MPE and the first measurement error E1 is required not to exceed the above described predetermined error range $E_R$ including zero. In case the first measurement error E1 exceeds the error range $E_R$ or any of the measurement errors E1, ..., Ek exceeds the maximum permissible error MPE, the device needs to be adjusted, repaired or replaced, and the method to be re-started from the beginning.

The applicability of a non-linear model already implies a significant drift of the measurement errors over time. Thus neither the drift, nor its significance have to be determined here.

In analogy to the previously described method, a statistically representative number of k-tupels of measurement errors (E1', ..., Ek') is randomly generated. Again, each measurement error E1', ..., Ek' is generated as a sum of the measurement errors E1, ..., Ek determined during the respective calibration and an additive e1', ek', accounting for the uncertainty of the respective calibration procedure. Like before, the additives e1', ..., ek' are randomly generated according to a probability distribution given the probability density function $PDF_1(e_{cal1}), \ldots, PDF_p(e_{calk})$ for obtaining a measurement error $e_{cal1}, \ldots, e_{calk}$ solely due to the uncertainty of the respective calibration procedure.

By fitting each k-tupel of randomly generated measurement errors (E1', ..., Ek') to the non-linear model, a vector of coefficients $(a_1', \ldots, a_p')$ is determined for each k-tupel.

Based on the vector of coefficients $(a_1', \ldots, a_p')$ determined for each k-tupel a crossing time $t_S$ is determined for each k-tupel, at which a measurement error E'(t) following the given model $E(t)=f(t;a_1,\ldots,a_p)$ based on the coefficients $(a_1', \ldots, a_p')$ obtained by the fit and passing through the random measurement errors E1', ..., Ek' at the respective calibrations times T1, ..., Tk exceeds the maximum permissible error MPE.

Again a probability density function $PDF_{TS}(t_S)$ of a crossing time $t_S$ at which the measurement error E of the device will exceed the maximum permissible error MPE is derived based on the frequency distribution of the determined crossing times $t_S$.

Like in the previous embodiment a confidence level γ is set according to the needs of the owner of the device, and a time $T_S(\gamma)$ at which the measurement error e of the device will exceed the maximum permissible error MPE can be predicted by the probability density function $PDF_{TS}(t_S)$ with the given confidence level γ by solving the following equation for $T_S(\gamma)$:

$$\int_{-\infty}^{T_S(\gamma)} PDF_{TS}(t_S)dt_S = \gamma.$$

Thus, at step 510, the next calibration of the device will be performed at a calibration time Tk+1, which is earlier or equal to the time $T_S(\gamma)$ at which the measurement error E of the device will exceed the maximum permissible error MPE with the given significance level γ.

What is claimed is:
1. A method of determining a calibration time interval for a calibration of a measurement device for measuring a quantity to be measured, comprising the steps of:
  performing a first calibration of the device at a first calibration time, wherein a first measurement error of the device is determined;
  adjusting, repairing or replacing the device and restarting the method from the beginning in case the first measurement error exceeds a predetermined error range including zero;

performing a second calibration of the device at a second calibration time, wherein a second measurement error of the device is determined;

adjusting, repairing or replacing the device and restarting the method from the beginning in case the second measurement error exceeds a predetermined maximum permissible error;

determining whether a significant drift between the first and the second measurement error occurred, and in case a significant drift occurred, determining the calibration time, at which a third calibration of the device shall be performed, as a third time, which is earlier or equal to a time at which the measurement error of the device will exceed the predetermined maximum permissible error with a given confidence level according to a probability density function of a crossing time wherein said crossing time is a time at which the measurement error of the device will exceed the maximum permissible error, wherein:

which probability density function is determined based on the first and the second measurement error, a probability density function for determining a measurement error in the first calibration solely due to a calibration uncertainty inherent to the first calibration, a probability density function for determining a measurement error in the second calibration solely due to a calibration uncertainty inherent to the second calibration, and the first and the second calibration time.

2. The method according to claim 1, wherein:

in case no significant drift was determined the calibration time at which the third calibration shall be performed is smaller or equal to a sum of the second time and a predetermined maximal permissible calibration time interval.

3. The method according to claim 1, wherein:

said predetermined error range is set to correspond to an upper limit for the uncertainty of the first calibration procedure, given by a capability requirement for the first calibration procedure to be capable of performing the calibration; or said predetermined error range has a lower limit given by a negative value of the uncertainty inherent to the first calibration and an upper limit given by a positive value of the uncertainty inherent to the first calibration; or said predetermined error range has an upper limit equal to a given percentage of an upper limit of the maximum permissible error and a lower limit equal to a given percentage of a lower limit of the maximum permissible error, wherein:

the percentage of the upper limit of the maximum permissible error is larger or equal to the positive value of the uncertainty of the first calibration, and small compared to the upper limit of the maximum permissible error; and the percentage of the lower limit of the maximum permissible error is smaller or equal to the negative value of the uncertainty of the first calibration, and large compared to the lower limit of the maximal permissible error.

4. The method according to claim 1, wherein;

a statistically representative number of pairs random measurement errors is generated, each comprising:

a first random measurement error, which is equal to a sum of the first measurement error and a random additive generated according to a probability distribution given by a probability density function for determining a measurement error during calibration, which is solely due to an uncertainty inherent to the first calibration procedure; and a second random measurement error, which is equal to a sum of the second measurement error and a random additive generated according to a probability distribution given by a probability density function for determining a measurement error during calibration, which is solely due to an uncertainty inherent to the second calibration procedure.

5. The method according to claim 4, further comprising the steps of:

for each pair determining a slope of a straight line passing through the first random measurement error at the first time and through the second random measurement error at the second time; and deriving a probability density function of a slope based on all determined slopes and their frequencies of occurrence, wherein:

determining that a significant drift between the first and the second measurement error occurred with a given significance level, in case an average of all determined slopes is larger than zero and an integral of the probability function of the slope over all negative slopes is smaller than the significance level; and in case the average of all determined slopes is smaller than zero and an integral of the probability function of the slope over all positive slopes is smaller than the significance level.

6. The method according to claim 4, further comprising the steps of:

for each pair of random measurement errors determining a crossing time at which a straight line passing through the first random measurement error at the first time and through the second random measurement error at the second time will exceed the maximum permissible error, and determining the probability density function of the crossing time at which the measurement error of the device will exceed the maximum permissible error as a frequency distribution of the crossing times.

7. The method of determining a calibration time interval for a calibration of a measurement device for measuring a quantity to be measured exhibiting a measurement error with a non-linear time dependency, based on a non-linear model comprising a given number of coefficients for said non-linear time dependency of said measurement error of the device comprising the steps of:

performing a number of calibrations of the device larger or equal to two and larger or equal to the number of coefficients at consecutive calibration times during each of which a measurement error of the device is determined;

adjusting, repairing or replacing the device and restarting the method from the beginning in case the first measurement error exceeds a predetermined error range including zero, and in case any of the measurement errors exceeds a predetermined maximum permissible error;

determining the calibration time, at which a next calibration of the device shall be performed, as a next time, which is earlier or equal to a time at which the measurement error of the device will exceed the predetermined maximum permissible error with a given confidence level according to a probability density function of a crossing time, wherein said crossing time is a time at which the measurement error of the device will exceed the maximum permissible error; and wherein said probability density function is determined based on the measurement errors, the times at which the calibrations were performed, and probability density functions for determining measurement errors during each of the calibrations solely due to the calibration uncertainty inherent to the respective calibration.

8. The method according to claim 7, wherein:

a statistically representative number of k-tupels of random measurement errors is generated;

each measurement error is equal to a sum of the measurement error determined during the corresponding calibration and a random additive generated according to a probability distribution given by a probability density function for determining a measurement error during the respective calibration, which is solely due to an uncertainty inherent to the respective calibration procedure, and for each k-tupel determining a vector of coefficients by fitting the random measurement errors of the k-tupel to the non-linear model;

for each vector of coefficients determining a crossing time at which a measurement error described by the model based on this vector of coefficients and passing through the random measurement errors of the k-tupel at the corresponding calibration times exceeds the maximum permissible error; and determining the probability density function of the crossing time at which the measurement error of the device will exceed the maximum permissible error as a frequency distribution of the crossing times.

* * * * *